(12) United States Patent
Chen (10) Patent No.: US 7,763,084 B2
(45) Date of Patent: *Jul. 27, 2010

(54) METHOD FOR MAKING BATTERY PLATES

(75) Inventor: Yu-Lin Chen, Menomonee Falls, WI (US)

(73) Assignee: Johnson Controls Technology Company, Holland, MI (US)

( * ) Notice: Subject to any disclaimer, the term of this patent is extended or adjusted under 35 U.S.C. 154(b) by 71 days.

This patent is subject to a terminal disclaimer.

(21) Appl. No.: 12/135,903

(22) Filed: Jun. 9, 2008

(65) Prior Publication Data

US 2008/0289161 A1 Nov. 27, 2008

Related U.S. Application Data

(60) Continuation of application No. 10/996,168, filed on Nov. 23, 2004, now Pat. No. 7,398,581, which is a division of application No. 09/755,337, filed on Jan. 5, 2001, now Pat. No. 6,953,641.

(51) Int. Cl.
*H01M 4/82* (2006.01)
*H01M 4/74* (2006.01)

(52) U.S. Cl. ............... 29/623.5; 29/2; 429/241; 429/242; 429/243

(58) Field of Classification Search ........... 29/623.5; 429/223, 224, 241, 242, 243
See application file for complete search history.

(56) References Cited

U.S. PATENT DOCUMENTS

| | | |
|---|---|---|
| 1,500,219 A | 7/1924 | Benner |
| 1,675,644 A | 7/1928 | Reginald et al. |
| 2,193,782 A | 3/1940 | Smith |
| 2,282,760 A | 5/1942 | Hauel |
| 3,349,067 A | 10/1967 | Hill |

(Continued)

FOREIGN PATENT DOCUMENTS

EP 0348702 1/1990

(Continued)

OTHER PUBLICATIONS

Patent Abstract for AU 275685 (1 pg.).

(Continued)

*Primary Examiner*—Patrick Ryan
*Assistant Examiner*—Thomas H. Parsons
(74) *Attorney, Agent, or Firm*—Lathrop & Clark LLP (57) ABSTRACT

A method of making a plurality of battery plates includes forming a strip including a plurality of battery grids. Each battery grid includes a grid network bordered by a frame element and includes a plurality of spaced apart grid wire elements. Each grid wire element has opposed ends joined to one of a plurality of nodes to define a plurality of open spaces in the grid network. The method also includes deforming at least a portion of a plurality of the grid wire elements such that the deformed grid wire elements have a first transverse cross-section at a point intermediate their opposed ends that differs from a second transverse cross-section taken at least one of their opposed ends. The method also includes applying a lead alloy coating to the strip, applying battery paste to the strip, and cutting the strip to form a plurality of battery plates.

19 Claims, 7 Drawing Sheets

U.S. PATENT DOCUMENTS

| | | | | |
|---|---|---|---|---|
| 3,398,024 | A | 8/1968 | Barnes | |
| 3,556,853 | A | 1/1971 | Cannone | |
| 3,556,854 | A | 1/1971 | Wheadon et al. | |
| 3,853,626 | A | 12/1974 | Daniels et al. | |
| 3,909,293 | A * | 9/1975 | Hammond et al. | 29/2 |
| 3,926,247 | A | 12/1975 | Geiger et al. | |
| 3,933,524 | A | 1/1976 | Hughel et al. | |
| 3,947,936 | A | 4/1976 | Wheadon | |
| 3,959,016 | A | 5/1976 | Tsuda | |
| 4,016,633 | A | 4/1977 | Smith et al. | |
| 4,097,625 | A | 6/1978 | Lunn et al. | |
| 4,107,407 | A * | 8/1978 | Koch | 429/225 |
| 4,140,840 | A | 2/1979 | Ruben | |
| 4,151,331 | A | 4/1979 | Hug et al. | |
| 4,196,757 | A | 4/1980 | Hug et al. | |
| 4,221,852 | A | 9/1980 | Qureshi | |
| 4,291,443 | A | 9/1981 | Laurie et al. | |
| 4,297,866 | A | 11/1981 | Sakauye et al. | |
| 4,303,747 | A | 12/1981 | Bender | |
| 4,305,187 | A | 12/1981 | Iwamura et al. | |
| 4,315,356 | A | 2/1982 | Laurie et al. | |
| 4,349,067 | A | 9/1982 | Wirtz et al. | |
| 4,386,987 | A | 6/1983 | Covitch et al. | |
| 4,460,666 | A | 7/1984 | Dinkler et al. | |
| 4,498,519 | A | 2/1985 | Watanabe et al. | |
| 4,606,383 | A | 8/1986 | Yanik | |
| 4,761,356 | A | 8/1988 | Kobayashi et al. | |
| 4,782,585 | A | 11/1988 | Kobayashi et al. | |
| 4,805,277 | A | 2/1989 | Yasuda et al. | |
| 4,865,928 | A | 9/1989 | Richter | |
| 4,865,933 | A | 9/1989 | Blanyer et al. | |
| 4,906,540 | A | 3/1990 | Hoshihara et al. | |
| 4,939,051 | A | 7/1990 | Yasuda et al. | |
| 4,982,482 | A | 1/1991 | Wheadon et al. | |
| 5,024,908 | A | 6/1991 | Terada et al. | |
| 5,344,727 | A | 9/1994 | Meadows et al. | |
| 5,462,109 | A | 10/1995 | Vincze et al. | |
| 5,543,250 | A | 8/1996 | Yanagihara et al. | |
| 5,582,936 | A | 12/1996 | Mrotek et al. | |
| 5,611,128 | A | 3/1997 | Wirtz | |
| 5,643,696 | A | 7/1997 | Rowlette | |
| 5,851,695 | A | 12/1998 | Misra et al. | |
| 5,858,575 | A | 1/1999 | Chen | |
| 5,958,625 | A | 9/1999 | Rao | |
| 5,989,749 | A * | 11/1999 | Kao et al. | 429/241 |
| 6,037,081 | A | 3/2000 | Kashio et al. | |
| 6,057,059 | A | 5/2000 | Kwok et al. | |
| 6,117,594 | A | 9/2000 | Taylor et al. | |
| 6,274,274 | B1 | 8/2001 | Schaeffer et al. | |
| 7,398,581 | B2 * | 7/2008 | Chen | 29/623.5 |

FOREIGN PATENT DOCUMENTS

| | | |
|---|---|---|
| EP | 0795917 | 9/1997 |
| JP | 55130076 | 10/1980 |
| JP | 55144649 | 11/1980 |
| JP | 56032678 | 4/1981 |
| JP | 56107474 | 8/1981 |
| JP | 56138872 | 10/1981 |
| JP | 56165279 | 12/1981 |
| JP | 56167271 | 12/1981 |
| JP | 57205969 | 12/1982 |
| JP | 58032367 | 2/1983 |
| JP | 58066266 | 4/1983 |
| JP | 58075772 | 5/1983 |
| JP | 59134563 | 8/1984 |
| JP | 60037663 | 2/1985 |
| JP | 60039766 | 3/1985 |
| JP | 60143570 | 7/1985 |
| JP | 60167267 | 8/1985 |
| JP | 60167268 | 8/1985 |
| JP | 60198055 | 10/1985 |
| JP | 61124052 | 6/1986 |
| JP | 63213264 | 9/1988 |
| JP | 1030168 | 2/1989 |
| JP | 2297864 | 12/1990 |
| JP | 3030260 | 2/1991 |
| JP | 3245462 | 11/1991 |
| JP | 5036416 | 2/1993 |
| JP | 5275081 | 10/1993 |
| JP | 8083617 | 3/1996 |
| JP | 8287905 | 11/1996 |
| JP | 10-284085 | 10/1998 |
| JP | 11-054115 | 2/1999 |
| WO | WO 99/27595 | 6/1999 |
| WO | WO 02/054513 | 7/2002 |

OTHER PUBLICATIONS

PCT International Search Report for PCT/US00/18114; date of mailing Oct. 9, 2000 (4 pgs.).

Office Action dated May 1, 2003 for U.S. Appl. No. 09/898,660 (12 pgs.).

Office Action dated Mar. 24, 2003 for U.S. Appl. No. 09/898,660 (6 pgs.).

U.S. Appl. No. 09/898,660, titled "Modification of the Shape/Surface Finish of Battery Grid Wires to Improve Paste Adhesion," Schaeffer et al., filed Jul. 2, 2001.

Ishikawa et al., "A Punched Grid Production Process for Automotive Batteries," Pb 80, 7th International Lead Conference, Madrid, 1980 (5 pgs.).

PCT International Search Report for PCT/US02/00390; date of mailing Aug. 19, 2002 (4 pgs.).

* cited by examiner

METHOD FOR MAKING BATTERY PLATES

CROSS-REFERENCE TO RELATED PATENT APPLICATIONS

This application is a Continuation of U.S. patent application Ser. No. 10/996,168, filed Nov. 23, 2004, which is a Divisional of U.S. application Ser. No. 09/755,337, filed Jan. 5, 2001, both of which are incorporated herein by reference in their entirety.

BACKGROUND

The present application relates to the modification of battery grids of the type used in lead-acid storage batteries, and more particularly, it relates to a modification of the surface finish of the battery grids of a lead-acid storage battery to improve paste adhesion and the service life of the battery.

Lead-acid storage batteries typically comprise several cell elements which are encased in separate compartments of a container containing sulfuric acid electrolyte. Each cell element includes at least one positive plate, at least one negative plate, and a porous separator positioned between each positive and negative plate. The positive and negative plates each comprise a lead or lead alloy grid that supports an electrochemically active material. The active material is a lead based material (i.e., PbO, $PbO_2$, Pb or $PbSO_4$ at different charge/discharge stages of the battery) that is pasted onto the grid. The grids provide an electrical contact between the positive and negative active materials which serves to conduct current.

Lead-acid battery manufacturing technologies and materials have improved in the last few decades. For example, because pure lead may be too soft for the manufacturing processes used to form battery grids, various alloying elements have been added to lead over the years to produce battery grids of sufficient strength to withstand battery manufacturing processes. For example, antimony was added to lead as lead-antimony alloys were found to be capable of being formed into battery grids at acceptable commercial rates by way of gravity casting techniques. However, it was discovered that when a lead antimony alloy is used in battery grids, water loss occurs because of gassing. Therefore, batteries having lead-antimony grids required periodic maintenance, i.e., the addition of water to the battery.

In order to lower the gassing rate of batteries, lead-calcium battery grids were developed. Batteries using lead-calcium alloy grids have relatively low gassing rates, and therefore, do not require the addition of water.

Another development in lead-acid battery manufacturing has been the manufacturing of battery plates in a continuous process, instead of traditional methods in which battery grids are made using a conventional gravity cast book mold operation and the cast grids are later pasted in a separate step. In a typical continuous battery plate making method, a lead alloy strip is manufactured, either by casting (namely, cast strip) or by casting and rolling (namely, wrought strip), and the strip is subsequently expanded or punched to generate the desired grid pattern in a strip of interconnected battery grids.

Typically, lead alloys having a relatively high level of calcium are used in continuous grid making processes as higher calcium levels tend to increase the hardness of the battery grids, which is beneficial in punching and expansion processes. Previously prepared active material battery paste (which may be prepared by mixing lead oxide, sulfuric acid, water, and optionally dry additives, such as fiber and expander) is then applied to the strip of interconnected battery grids and the strip is parted into single battery plates. Advantages of continuous battery plate making are improved production rate, improved dimensional control, thinner plates, lower scrap rate and lower manufacturing costs.

The pasted plates are next typically cured for many hours under elevated temperature and humidity to oxidize free lead (if any) and adjust the crystal structure of the plate. After curing, the plates are assembled into batteries and electrochemically formed by passage of current to convert the lead sulfate or basic lead sulfate(s) to lead dioxide (positive plates) or lead (negative plates). This is referred to as the "formation" process.

It is well known that lead-acid batteries will eventually fail in service through one or more of several failure modes. One such failure mode is failure due to corrosion of the grid surface. Electrochemical action corrodes the grid surface and reduces the adhesion between the active material and the grid (e.g., failure of the battery occurs when the grids are no longer able to provide adequate structural support or current flow due to the separation of the active material from the grid).

The formation efficiency of lead-acid batteries also may depend on the positive plate, in particular, to the extent of conversion of lead monoxide (PbO) to lead dioxide ($PbO_2$) in the active positive material. The high electrical potential required for formation appears to be related to the transformation of non-conductive paste materials to $PbO_2$. A low formation efficiency of positive plates requires a high formation charge. Inefficient charging also leads to deficiencies in the resulting batteries assembled with such plates. Typically, the initial capacity (performance) of the battery is low if the battery is not completely formed, requiring additional cycling to reach specific performance values. It is believed that by increasing the adhesion between the paste mixture and the grid, formation efficiency can be improved. Among other things, the increased adhesion between the grid and the paste provides for improved interfacial contact between the grid and paste thereby improving current flow between the grid and paste.

There is a need in the battery manufacturing field for even more effective methods for improving the service life of a battery. More particularly, there is a need for a method that can more greatly increase the adherence of active material to a battery grid produced by a continuous process.

SUMMARY OF THE INVENTION

The present invention relates to a method of making a plurality of battery plates that includes forming a strip including a plurality of battery grids. Each battery grid includes a grid network bordered by a frame element and includes a plurality of spaced apart grid wire elements. Each grid wire element has opposed ends joined to one of a plurality of nodes to define a plurality of open spaces in the grid network. The method also includes deforming at least a portion of a plurality of the grid wire elements such that the deformed grid wire elements have a first transverse cross-section at a point intermediate their opposed ends that differs from a second transverse cross-section taken at least one of their opposed ends. The method also includes applying a lead alloy coating to the strip, applying battery paste to the strip, and cutting the strip to form a plurality of battery plates.

The present invention also relates to a method of making a plurality of battery plates that includes melting a lead alloy grid material and continuously casting the grid material to form a continuous strip. The method also includes punching grid material out of the strip to form interconnected battery grids, each interconnected battery grid including a grid network bordered by a frame. The grid network includes a plurality of spaced apart grid wire elements. Each grid wire element includes opposed ends, each opposed end being joined to one of a plurality of nodes to define a plurality of open spaces in the grid network. The method also includes deforming a portion of a plurality of the grid wire elements such that a first transverse cross-section intermediate its opposed ends differs from a second transverse cross-section taken at least one of its opposed ends. The method also includes applying a lead alloy coating to the interconnected battery grids and cutting the interconnected battery grids to form a plurality of battery plates.

The present invention also relates to a method of making a plurality of battery grids that includes forming a strip of interconnected battery grids from a lead alloy grid material, each interconnected battery grid including a grid network bordered by at least one frame element. The grid network includes a plurality of spaced apart grid wire elements, each grid wire element having opposed ends. The method also includes deforming a portion of a plurality of the grid wire elements such that a first transverse cross-section intermediate its opposed ends differs from a second transverse cross-section taken at least one of its opposed ends. The method also includes applying a lead alloy coating to the strip of interconnected battery grids and cutting the strip to form a plurality of battery plates.

DETAILED DESCRIPTION OF EXEMPLARY EMBODIMENTS

Figure 1:
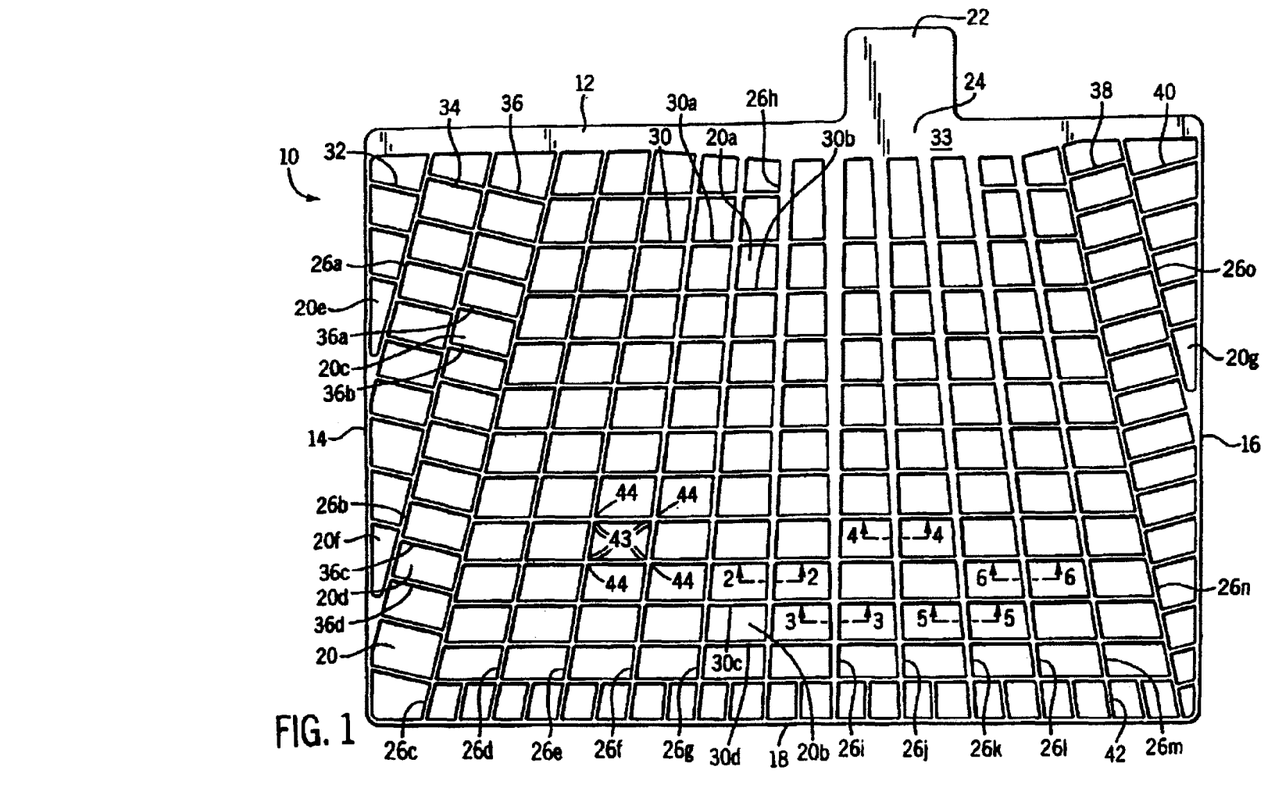
FIG. 1 shows a battery grid made in accordance with an exemplary embodiment.

FIG. 1 shows a front view of a battery grid made in accordance with an exemplary embodiment. The grid is a stamped grid made of a lead alloy grid material coated with a lead alloy, and functions in the same manner as other battery grids known in the art. It should be noted that an infinite number of grid designs may result from the present invention and therefore, it is not the intent of the following description to limit the invention to the grid design shown in FIG. 1, which is presented for the purposes of illustration.

Referring now to FIG. 1, the grid 10 comprises a frame that includes a top frame element 12, first and second side frame elements 14 and 16, and a bottom frame element 18. The grid 10 includes a series of grid wires that define open areas 20 that hold the electrochemical paste (not shown) that provides the current generation. A current collection lug 22 is integral with the top frame element 12 and is offset from the center of the top frame element 12. The top frame element 12 includes an enlarged conductive section 24 directly beneath the lug 22, and has the shape shown to optimize current conduction to the lug 22.

A series of radially extending vertical grid wire elements 26a-26o form part of the grid 10. The vertical wire elements 26c-26n are connected to the top frame element 12 and the bottom frame element 18, the vertical wire elements 26a-26b are connected to the top frame element 12 and to the first side frame element 14, and the vertical wire element 26o is connected to the top frame element 12 and the side frame element 16, as shown. The vertical wire element 26i is parallel to the side elements 14 and 16, and the remaining vertical wire elements 26a-26h and 26j-26o extend radially toward an imaginary intersecting point along a radius line running through the vertical element 26i. The vertical wire elements 26a-26o become closer together when moving from the bottom element 18 towards the top element 12 and get farther apart when moving towards the left element 14 or the right element 16 from the vertical element 26i.

The grid 10 also includes a plurality of horizontal or cross wire elements. The cross wire elements include a set of parallel horizontal wire elements 30 positioned in a middle portion of the grid 10. Additionally, the grid 10 includes a first set of cross wire elements 32 connected between the left frame element 14 and the vertical element 26a that are parallel to each other, a second set of cross wire elements 34 connected between the vertical elements 26a and 26b that are parallel to each other, and a third set of cross wire elements 36 connected between the vertical elements 26b and 26c that are parallel to each other at the left side of the grid 10. Also, the grid 10 includes a fourth set of cross wire elements 38 connected between the vertical elements 26n and 26o that are parallel to each other and a fifth set of cross wire elements 40 connected between the vertical element 26o and the right frame element 16 that are parallel to each other at the right side of the grid, as shown. A series of short support wires 42 are connected to the bottom frame member 18 as shown.

Individual sections of the vertical wire elements 26a-26o and the horizontal wire elements 30 or the cross wire elements 32-40 have opposed ends 43 which are joined at a plurality of nodes 44 that define the open areas 20 that support the electrochemical paste for conduction.

The grid wire cross-sections shown in FIGS. 2-6A illustrate versions of a grid wire section formed by various exemplary embodiments described below. In the battery grid, each grid wire section may have a different cross-sectional configuration, or each grid wire section may have the same cross-sectional configuration. It is also important to note that although certain features have been illustrated in FIGS. 2-6A by way of cross-sectional views of vertical grid wires, the same cross-sectional views could apply when taking a cross-section of horizontal grid wires. In other words, the similar deformation methods as illustrated in FIGS. 2 to 6A can also be applied to the horizontal wire elements. Depending on the needs, a grid can be deformed at the vertical wire elements only, or at both the vertical and horizontal wire elements, or not deformed at any of the wire elements.

Figure 2:
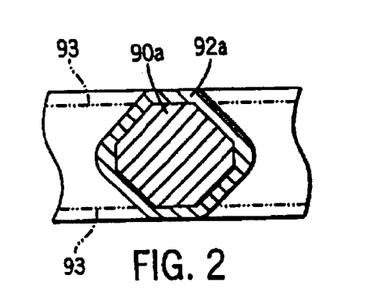
FIG. 2 shows a cross-section of a grid wire section taken along line 2-2 of FIG. 1.

FIG. 2 shows a cross-section of a section of vertical wire element 26h taken at a position between the opposed ends of the grid wire section. It can be seen that at the position between the opposed ends of this grid wire section, the cross-section of the grid wire includes a grid wire base 90a which is substantially an octagon, and an alloy coating 92a. Also shown in phantom at 93 is the interface between the grid wire base 90a and the alloy coating 92a below the opposed flat planar surfaces 33 of the grid. It can be appreciated by those in the art that a battery grid wire section or node will not have a perfect geometric configuration and that the rounding of edges and corners of a grid wire section, base, coating surface, or node is often the result of a manufacturing operation. For this reason, the description of cross-sectional shapes in the specification will be proceeded by the word "substantially" to indicate that the cross-sectional shape may vary somewhat from a perfect geometric shape.

Figure 3:
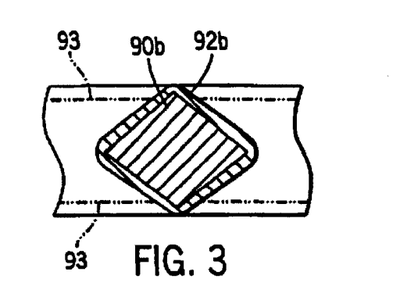
FIG. 3 shows a cross-section of a grid wire section taken along line 3-3 of FIG. 1.

FIG. 3 shows a cross-section of a section of vertical wire element 26i taken at a position between the opposed ends of the grid wire section. It can be seen that at the position between the opposed ends of this grid wire section, the cross-section of the grid wire includes a grid wire base 90b has been rotated 45 degrees in relation to the node and has a substantially rectangular cross-section. The cross-section of the grid wire also shows an alloy coating 92b. Also shown in phantom at 93 is the interface between the grid wire base 90b and the alloy coating 92b below the opposed flat planar surfaces 33 of the grid.

Figure 4:
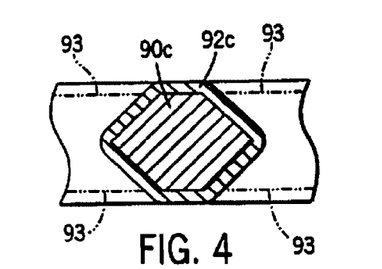
FIG. 4 shows a cross-section of a grid wire section taken along line 4-4 of FIG. 1.

FIG. 4 shows a cross-section of a section of vertical wire element 26j taken at a position between the opposed ends of the grid wire section. It can be seen that at the position between the opposed ends of this grid wire section, the cross-section of the grid wire includes a grid wire base 90c which is substantially a hexagon and an alloy coating 92c. The grid wire base 90c has opposed surfaces which are coplanar with the surface of the adjacent nodes. Also shown in phantom at 93 is the interface between the grid wire base 90c and the alloy coating 92c below the opposed flat planar surfaces 33 of the grid.

Figure 5:
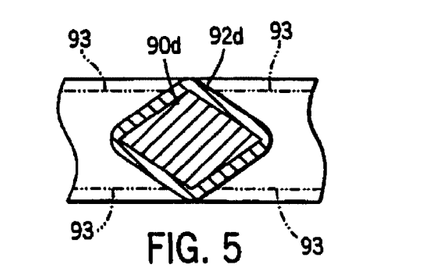
FIG. 5 shows a cross-section of a grid wire section taken along line 5-5 of FIG. 1.

FIG. 5 shows a cross-section of a section of vertical wire element 26k taken at a position between the opposed ends of the grid wire section. It can be seen that at the position between the opposed ends of this grid wire section, the cross-section of the grid wire includes a grid wire base 90d which is substantially a diamond and an alloy coating 92d. Also shown in phantom at 93 is the interface between the grid wire base 90d and the alloy coating 92d below the opposed flat planar surfaces 33 of the grid.

Figure 6A:
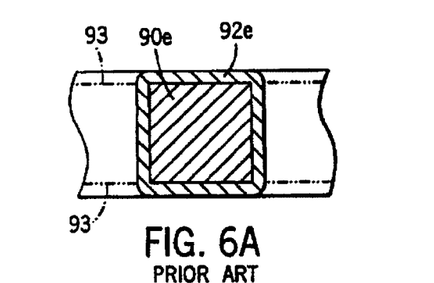
FIG. 6A shows a cross-section of a grid wire section taken along line 6-6 of FIG. 1.

FIG. 6A shows a cross-section of a section of vertical wire element 26l taken at a position between the opposed ends of the grid wire section. This figure shows the configuration of a conventional stamped battery grid wherein the cross section of the node and the cross-section at all positions along the grid wire section are substantially rectangular and the surfaces of the node and grid wire section (which includes a grid wire base 90e) include an alloy coating 92e. Also shown in phantom at 93 is the interface between the grid wire base 90e and the alloy coating 92e below the opposed flat planar surfaces 33 of the grid.

Figure 6B:
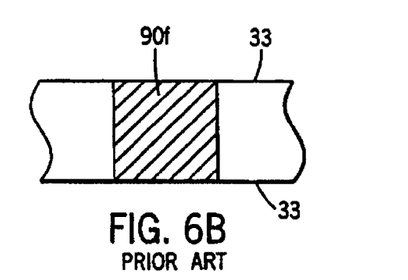
FIG. 6B shows a cross-section of a grid wire section without an alloy coating taken along line 6-6 on FIG. 1.

FIG. 6B shows another version of the cross-section of a section of vertical wire element 26l taken at a position between the opposed ends of the grid wire section wherein the grid does not include an alloy coating. It can be seen that the cross-section of the node and the cross-section at all positions along the grid wire section are substantially rectangular and the cross-sectional area of each grid wire does not extend above or below opposed flat planar surfaces 33 of the grid.

Figure 6C:
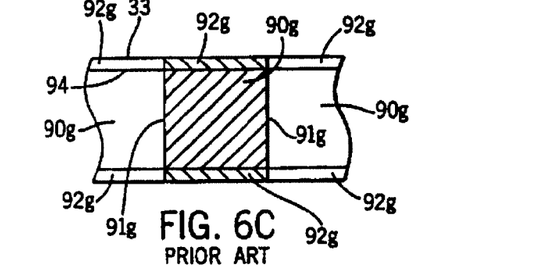
FIG. 6C shows a cross-section of a grid wire section having a partial alloy coating taken along the line 6-6 of FIG. 1.

FIG. 6C shows yet another version of the cross-section of a section of vertical wire element 26l taken at a position between the opposed ends of the grid wire section. In this cross-section of the grid wire, there is shown a grid wire base 90g and an alloy coating 92g. The alloy coating 92g is disposed on the flat planar surfaces 33 of the grid; however, no alloy coating is present on surfaces 91g of the grid wire element that are transverse to the flat planar surfaces 33.

One advantage of the battery grid construction shown in FIGS. 2-6A can be best understood with reference to FIGS. 6A and 6B. FIG. 6A shows the configuration of a conventional stamped battery grid that has been coating with an alloy coating 92e after stamping. The cross section of the node and the cross-section at all positions along the grid wire section comprising the grid wire base 90e are substantially rectangular. However, the surface of the alloy coating 92e is slightly rounded at the regions near the four corners of the grid wire base 90e. When applying battery paste to a grid as in FIG. 6A, the slightly rounded grid wires allow the paste to flow around the wire. The rough surface of the wires provide a mechanical graft and interlock of paste particles. Therefore, the contact between the grid and the battery paste is good and the plate is strong.

FIG. 6B shows the configuration of a conventional stamped battery grid wherein the cross section of the node and the cross-section at all positions along the grid wire section 90f are substantially rectangular. When applying battery paste to a grid as in FIG. 6B, it is much more difficult to make good contact between the battery paste and the surface of the wire moving in a direction perpendicular to the direction in which the paste is applied because the flow of paste must change in a 90 degree step. This is analogous to the situation where water flows down a 90 degree cliff, and the surface right below the edge of the cliff is not contacted by the falling water. With a grid wire orientation other than 90 degrees, the change of paste flow is gradual and continuous and therefore, provides better paste coverage. When the battery paste is cured and dried, it will shrink and generate tensile force at the paste/grid interface. The tensile force at the paste/grid wire interface is at a maximum when the wire surface is perpendicular to the grid surface and at a minimum when the wire surface is parallel to the grid surface. As a result, a gap is formed between the grid wire and the paste at the location where the tensile force is the maximum. Because of a lack of contact between the paste and the grid, a battery made with this type of plate is much more difficult to form, performs poorly in certain reserve capacity tests, and does not exhibit satisfactory cycle life.

Figure 7A:
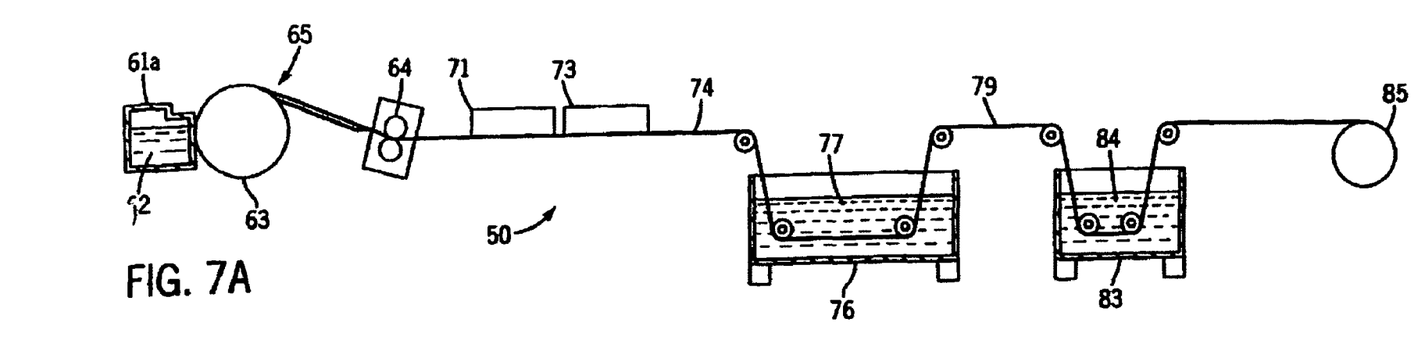
FIG. 7A is a schematic illustration of an apparatus for producing a battery grid according to an exemplary embodiment.

In FIG. 7A, there is shown one apparatus, indicated generally at 50, for forming a battery grid according to an exemplary embodiment. The apparatus 50 includes a heated lead pot 61a, which contains the molten lead alloy 62 that forms the base of the battery grids, and an internally cooled rotating casting drum 63. In operation, the molten lead alloy 62 contacts the cooled drum surface and freezes to form a solid lead alloy strip 65 of substantially constant width and thickness. The lead alloy strip 65 may optionally be rolled by rollers 64 to change the thickness and grain structure of the strip 65. The continuous strip 65 is then fed into a punching station 71 wherein a series of interconnected battery grids is formed by punching grid material out of the continuous strip 65.

During punching operations in the punching station 71, the strip 65 is maintained as a continuous strip and preferably the interconnected battery grid shapes and formed in a progressive punching operation, i.e., features are added to the battery grid through several punching operations. The punching station 71 may form a strip of interconnected battery grids, each of which has a configuration such as that shown in FIG. 1.

After the strip exists the punching station 71, the battery grid wire sections of the strip may optionally be processed in a coining station 73. The coining station 73 is used to deform or coin the grid wires so that the grid wires have a cross-section similar to one of the grid wire cross-sections 90a, 90b, 90c or 90d shown in FIGS. 2-5. For instance, the coining station 73, may include a die or dies that deform the rectangular cross-section of the grid wires of the punched grid into an octagonal cross-section 90a as shown in FIG. 2. The other exemplary wire cross-sections shown in FIGS. 3-5 may also be formed. The strip of punched (and optionally, coined) interconnected battery grids 74 exiting the punching station 71 (and optionally, the coining station 73) is fed through an alloy coating bath 76 that contains a molten lead alloy 77 to form a strip of alloy coated interconnected battery grids 79. The length of the alloy coating bath 76 may vary with the composition of the molten lead alloy 77, the thickness of the alloy coating to be deposited, and the rate at which the strip of punched interconnected battery grids 74 moves through the alloy coating bath 76. The strip of alloy coated interconnected battery grids 79 is then fed through a quench bath 83 containing quench fluid 84 (preferably water) and is coiled onto a take up reel 85. The quenching preserves the resolutionized grains of the strip of alloy coated interconnected battery grids 79 in a much more stable condition. The reel of alloy coated interconnected battery grids 79 may then be age hardened. While the reel of alloy coated interconnected battery grids 79 can be age hardened at room temperature (i.e., 25° C.), it is preferred to age harden the reel of alloy coated interconnected battery grids 79 at an elevated temperature (i.e., above 25° C.). Thereafter, the reel of alloy coated interconnected battery grids 79 may be uncoiled and fed to a paster and parted into battery plates (as is known in the art) for assembly into a battery. Alternatively, the reel of alloy coated interconnected battery grids 79 may be uncoiled and divided into individual battery grids which are subsequently pasted to form battery plates.

Figure 7B:
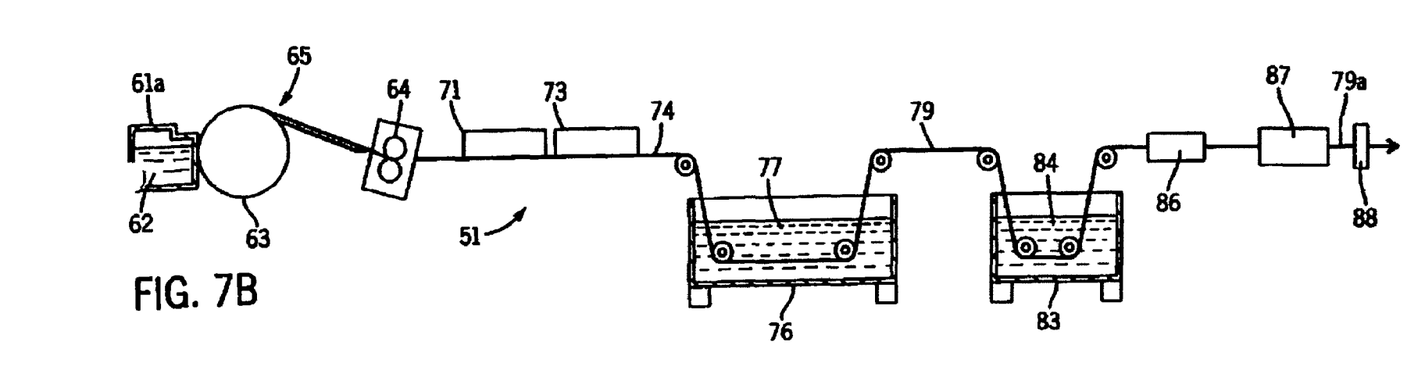
FIG. 7B is a schematic illustration of an apparatus for producing a battery grid according to an exemplary embodiment.

In FIG. 7B, there is shown another apparatus, indicated generally at 51, for forming a battery grid according to an exemplary embodiment. In the apparatus 51, a strip of alloy coated interconnected battery grids 79 is produced using the casting drum 63, the punching station 71, the coining station 73 (if desired), the alloy coating bath 76 and the quench tank 83 as in the apparatus 50 of FIG. 7A. However, in the apparatus 51 of FIG. 7B, the strip of alloy coated interconnected battery grids 79 enters an oven 86 after exiting the quench tank 83 in order to immediately age harden the strip of alloy coated interconnected battery grids 79 after quenching. After age hardening in the oven 86, the strip of alloy coated interconnected battery grids 79 is fed through a paster 87 where conventional battery paste is applied to the strip of alloy coated interconnected battery grids 79. A strip of pasted alloy coated interconnected battery grids 79a exits the paster 87 and is separated into individual battery plates in a parter 88 before assembly into a battery.

Figure 7C:
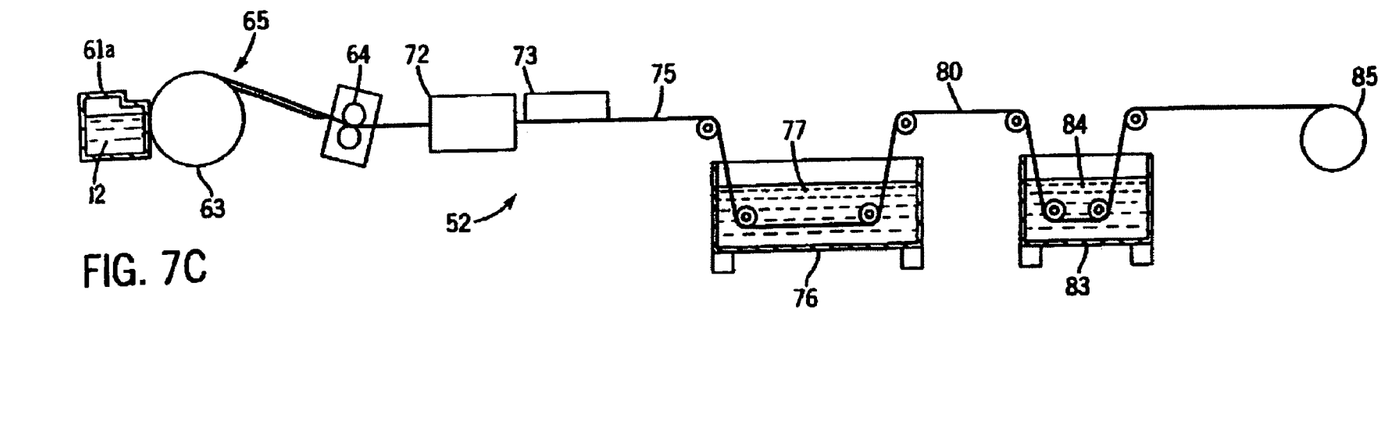
FIG. 7C is a schematic illustration of an apparatus for producing a battery grid according to an exemplary embodiment.

In FIG. 7C, there is shown another apparatus, indicated generally at 52, for forming a battery grid according to an exemplary embodiment. In the apparatus 52, a lead alloy strip 65 is formed using the casting drum 63 as in the apparatus 50 of FIG. 7A. The lead alloy strip 65 is then expanded into a strip of interconnected battery grids 75 in an expander 72. After the strip of interconnected battery grids 75 exits the expander 72, the battery grid wire sections of the strip may optionally be processed in a coining station 73 as described above with reference to the apparatus 50 of FIG. 7A. The strip of interconnected battery grids 75 is then fed through the alloy coating bath 76 to form a strip of alloy coated interconnected battery grids 80 which is quenched in quench tank 83 and coiled onto take up reel 85. The reel of alloy coated interconnected battery grids 80 may then be heated to age harden the interconnected battery grids 80. The strip of interconnected battery grids 80 may be uncoiled and fed to a paster and parted into battery plates that are assembled into a battery. Alternatively, the reel of alloy coated interconnected battery grids 80 may be uncoiled and divided into individual battery grids which are subsequently pasted to form battery plates.

Figure 7D:
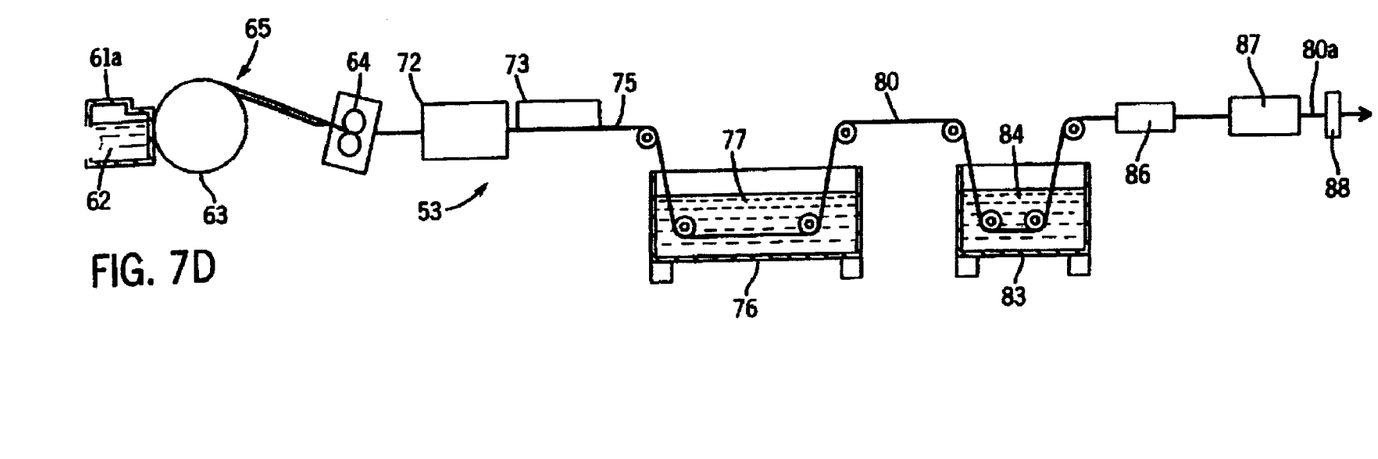
FIG. 7D is a schematic illustration of an apparatus for producing a battery grid according to an exemplary embodiment.

In FIG. 7D, there is shown another apparatus, indicated generally at 53, for forming a battery grid according to an exemplary embodiment. In the apparatus 53, a strip of alloy coated interconnected battery grids 80 is produced using the casting drum 63, the expander 72, the coining station 73, the alloy coating bath 76 and the quench tank 83 as in the apparatus 52 of FIG. 7C. However, in the apparatus 53 of FIG. 7D, the strip of alloy coated interconnected battery grids 80 enters an oven 86 immediately after exiting the quench tank 83 in order to age harden the strip of alloy coated interconnected battery grids 80. After age hardening in the oven 86, the strip of alloy coated interconnected battery grids 80 is fed through a paster 87 where conventional battery paste is applied to the strip of alloy coated interconnected battery grids 80. A strip of pasted alloy coated interconnected battery grids 80a exits the paster 87 and is separated into individual battery plates in a parter 88 before assembly into a battery.

While the apparatus 52 of FIG. 7C and the apparatus 53 of FIG. 7D provide suitable results when used to practice the present invention, the apparatus 50 of FIG. 7A and the apparatus 51 of FIG. 7B are particularly advantageous in that complex battery grid shapes (such as that shown in FIG. 1) may be produced using the punching station 71 and optionally, the coining station 73. Specifically, the expander 72 used in the apparatus 52 of FIG. 7C and the apparatus 53 of FIG. 7D produces a continuous length of expanded metal grids that are limited in wire pattern, wire shape, and lead distribution. In contrast, the apparatus 50 of FIG. 7A and the apparatus 51 of FIG. 7B produce a continuous length of punched grids having optimized grid wire patterns, asymmetric and offset grid wire patterns, improved grid wire thickness control (grid wire aspect ratios), improved grid wire shape control, improved lead distribution in the grid (percent lead distribution from the top to the bottom of the grid), and grain control. As a result, the corrosion performance is enhanced because of the relatively stress free grain structure and low porosity of the punched sheet. In addition, the punching process does not substantially deform the grain or add other stresses into the grid which might lead to corrosion initiation sites. The electrical performance is enhanced as a result of unique and optimized grid wire patterns, improved control of grid wire size and optimized lead distribution within the grid. Thus, the apparatus 50 of FIG. 7A and the apparatus 51 of FIG. 7B produce a battery grid that has the advantages of optimized grid wire patterns and the advantages of an alloy coating.

Figure 8A:
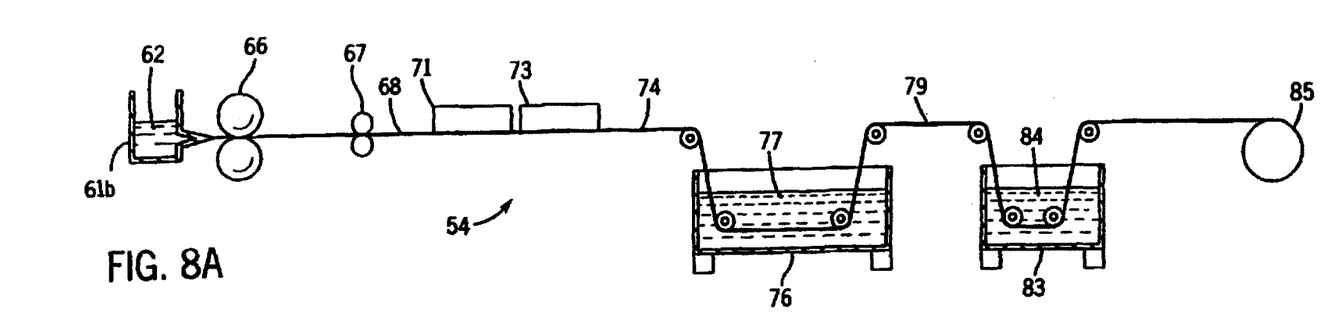
FIG. 8A is a schematic illustration of an apparatus for producing a battery grid according to an exemplary embodiment.

In FIG. 8A, there is shown another apparatus, indicated generally at 54, for forming a battery grid according to an exemplary embodiment. The apparatus 54 includes a heated lead pot 61b, which contains the molten lead alloy 62 that forms the base of the battery grids, and a pair of twin casting rollers 66. In operation, the molten lead alloy 62 contacts the roller surfaces and freezes to form a solid lead alloy strip 68 of substantially constant width and thickness. The lead alloy strip 68 may optionally be further rolled by rollers 67 to change the thickness and grain structure of the strip 68. The continuous strip 68 is then fed into a punching station 71 wherein a series of interconnected battery grids is formed by punching grid material out of the continuous strip 68.

During punching operations in the punching station 71, the strip 68 is maintained as a continuous strip and preferably the interconnected battery grid shapes and formed in a progressive punching operation, i.e., features are added to the battery grid through several punching operations. The punching station 71 may form a strip of interconnected battery grids, each of which has a configuration such as that shown in FIG. 1.

After the strip exists the punching station 71, the battery grid wire sections of the strip may optionally be processed in a coining station 73. The coining station 73 is used to deform or coin the grid wires so that the grid wires have a cross-section similar to one of the grid wire cross-sections 90a, 90b, 90c or 90d shown in FIGS. 2-5. For instance, the coining station 73, may include a die or dies that deform the rectangular cross-section of the grid wires of the punched grid into an octagonal cross-section 90a as shown in FIG. 2. The other exemplary wire cross-sections shown in FIGS. 3-5 may also be formed. The strip of punched (and optionally, coined) interconnected battery grids 74 exiting the punching station 71 (and optionally, the coining station 73) is then fed through an alloy coating bath 76 that contains a molten lead alloy 77 to form a strip of alloy coated interconnected battery grids 79, as described with reference to FIG. 7A. The strip of alloy coated interconnected battery grids 79 is then fed through a quench fluid 84 and is coiled onto a take up reel 85. The reel of alloy coated interconnected battery grids 79 may then be heated to age harden the interconnected battery grids 79. The reel of alloy coated interconnected battery grids 79 may be uncoiled and fed to a paster and parted into battery plates that are assembled into a battery. Alternatively, the reel of alloy coated interconnected battery grids 79 may be uncoiled and divided into individual battery grids which are subsequently pasted to form battery plates.

Figure 8B:
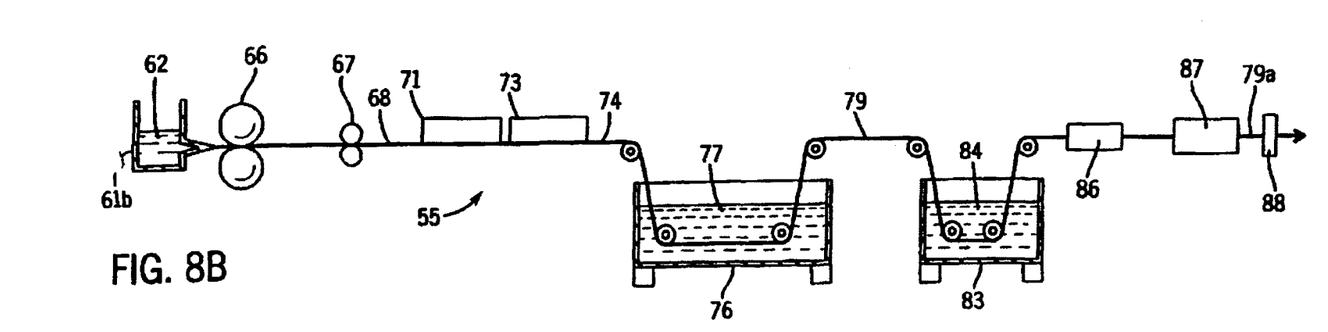
FIG. 8B is a schematic illustration of an apparatus for producing a battery grid according to an exemplary embodiment.

In FIG. 8B, there is shown another apparatus, indicated generally at 55, for forming a battery grid according to an exemplary embodiment. In the apparatus 55, a strip of alloy coated interconnected battery grids 79 is produced using the twin roll caster 66, the punching station 71, the coining station 73 (if desired), the alloy coating bath 76 and the quench tank 83 as in the apparatus 54 of FIG. 8A. However, in the apparatus 55 of FIG. 8B, the strip of alloy coated interconnected battery grids 79 enters an oven 86 after exiting the quench tank 83 in order to age harden the strip of alloy coated interconnected battery grids 79. After age hardening, the strip of alloy coated interconnected battery grids 79 is fed through a paster 87 where conventional battery paste is applied to the strip of alloy coated interconnected battery grids 79. A strip of pasted alloy coated interconnected battery grids 79a exits the paster 87 and is separated into individual battery plates in a parter 88.

Figure 8C:
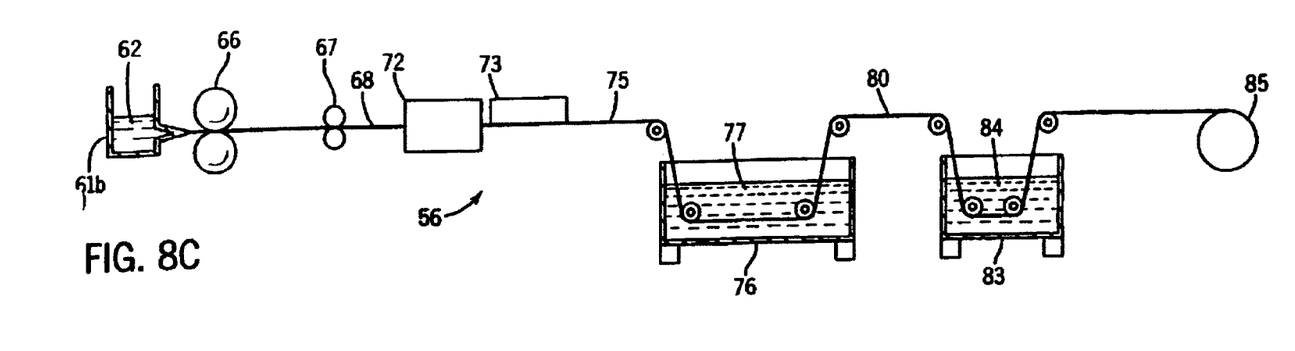
FIG. 8C is a schematic illustration of an apparatus for producing a battery grid according to an exemplary embodiment.

In FIG. 8C, there is shown another apparatus, indicated generally at 56, for forming a battery grid according to an exemplary embodiment. In the apparatus 56, a lead alloy strip 68 is formed using the twin roll caster 66 as in the apparatus 54 of FIG. 8A. The lead alloy strip 68 is then expanded into a strip of interconnected battery grids 75 in an expander 72. After the strip of interconnected battery grids 75 exits the expander 72, the battery grid wire sections of the strip may optionally be processed in a coining station 73 as described above with reference to the apparatus 50 of FIG. 7A. The strip of interconnected battery grids 75 is then fed through the alloy coating bath 76 to form a strip of alloy coated interconnected battery grids 80 which is quenched in quench tank 83 and coiled onto take up reel 85. The reel of alloy coated interconnected battery grids 80 may then be heated to age harden the interconnected battery grids 80. The strip of interconnected battery grids 80 may be uncoiled and fed to a paster and parted into battery plates that are assembled into a battery. Alternatively, the reel of alloy coated interconnected battery grids 80 may be uncoiled and divided into individual battery grids which are subsequently pasted to form battery plates.

Figure 8D:
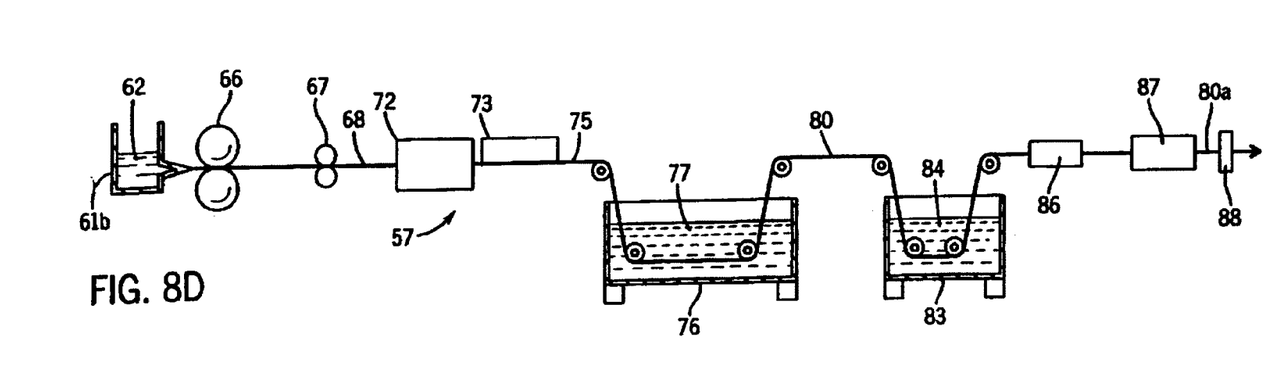
FIG. 8D is a schematic illustration of an apparatus for producing a battery grid according to an exemplary embodiment.

In FIG. 8D, there is shown another apparatus, indicated generally at 57, for forming a battery grid according to an exemplary embodiment. In the apparatus 57, a strip of alloy coated interconnected battery grids 80 is produced using the twin roll caster 66, the expander 72, the coining station 73 (if desired), the alloy coating bath 76 and the quench tank 83 as in the apparatus 56 of FIG. 8C. However, in the apparatus 57 of FIG. 8D, the strip of alloy coated interconnected battery grids 80 enters an oven 86 after exiting the quench tank 83 in order to age harden the strip of alloy coated interconnected battery grids 80. After age hardening, the strip of alloy coated interconnected battery grids 80 is fed through a paster 87 where conventional battery paste is applied to the strip of alloy coated interconnected battery grids 80. A strip of pasted alloy coated interconnected battery grids 80a exits the paster 87 and is separated into individual battery plates in a parter 88.

Figure 9A:
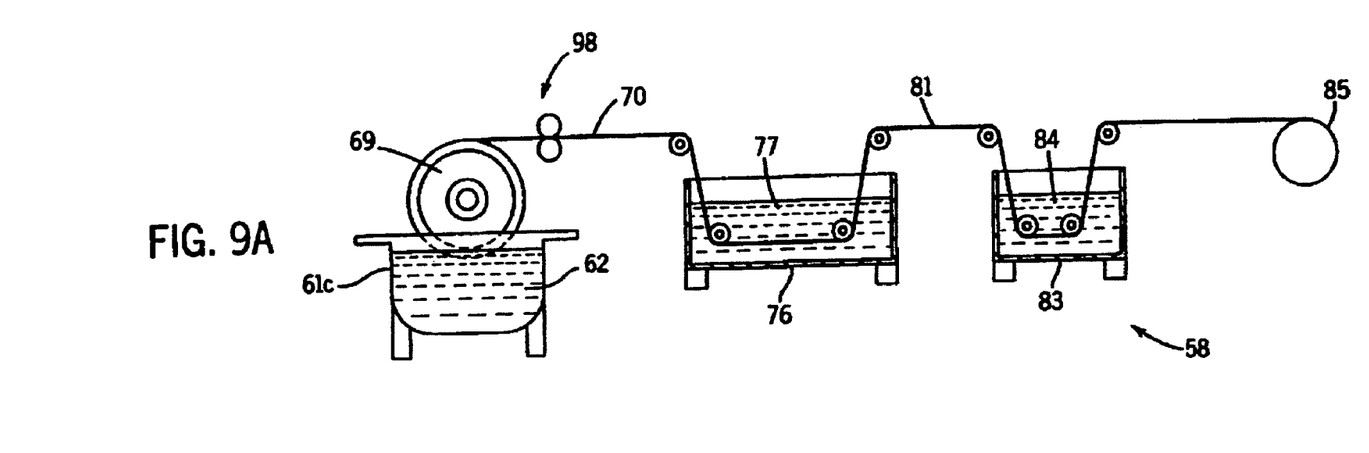
FIG. 9A is a schematic illustration of an apparatus for producing a battery grid according to an exemplary embodiment.

In FIG. 9A, there is shown another apparatus, indicated generally at 58, for forming a battery grid according to an exemplary embodiment. The apparatus 58 includes a heated lead pot 61c, which contains the molten lead alloy 62 that forms the base of the battery grids, and a casting drum 69. In operation, the molten lead alloy 62 contacts the casting drum surfaces and freezes to form a strip of interconnected battery grids 70. A suitable casting device that may be used in the apparatus 58 to form the strip of interconnected battery grids 70 is shown and described in U.S. Pat. No. 4,349,067, which is incorporated herein by reference. Optionally, the strip of interconnected battery grids 70 removed from the surface of the casting drum 69 may be fed through one or more sets of rollers 98 in order to reduce the thickness of the strip of interconnected battery grids 70. The strip of interconnected battery grids 70 is then fed through an alloy coating bath 76 that contains a molten lead alloy 77 to form a strip of alloy coated interconnected battery grids 81, as described with reference to FIG. 7A. The strip of alloy coated interconnected battery grids 81 is then fed through a quench fluid 84 and is coiled onto a take up reel 85. The reel of alloy coated interconnected battery grids 81 may then be heated to age harden the interconnected battery grids 81. The reel of alloy coated interconnected battery grids 81 may be uncoiled and fed to a paster and parted into battery plates that are assembled into a battery. Alternatively, the reel of alloy coated interconnected battery grids 81 may be uncoiled and divided into individual battery grids which are subsequently pasted to form battery plates.

Figure 9B:
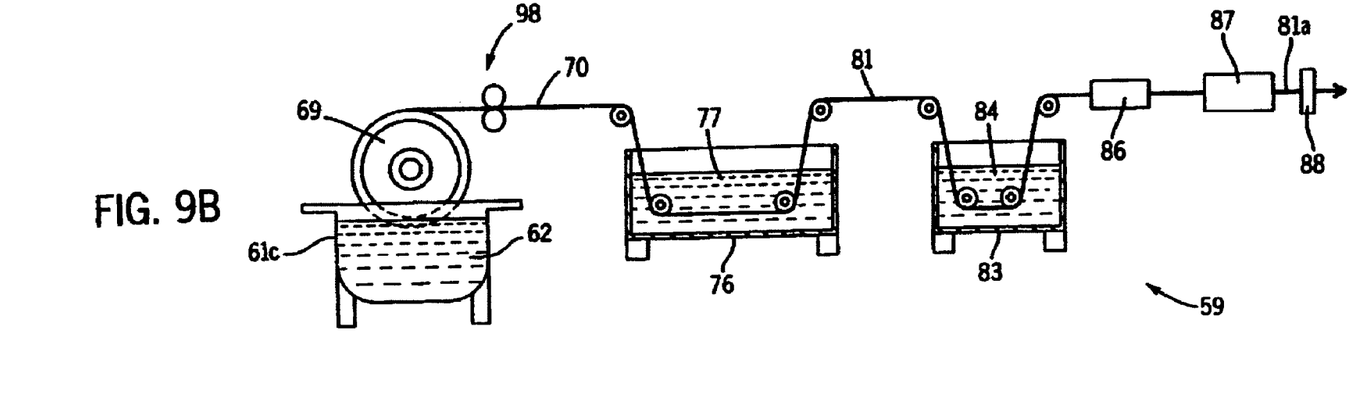
FIG. 9B is a schematic illustration of an apparatus for producing a battery grid according to an exemplary embodiment.

In FIG. 9B, there is shown another apparatus, indicated generally at 59, for forming a battery grid according to an exemplary embodiment. In the apparatus 59, a strip of alloy coated interconnected battery grids 81 is produced using the casting drum 69, optionally the rollers 98, the alloy coating bath 76 and the quench tank 83 as in the apparatus 58 of FIG. 9A. However, in the apparatus 59 of FIG. 9B, the strip of alloy coated interconnected battery grids 81 enters an oven 86 after exiting the quench tank 83 in order to age harden the strip of alloy coated interconnected battery grids 81. After age hardening, the strip of alloy coated interconnected battery grids 81 is fed through a paster 87 where conventional battery paste is applied to the strip of alloy coated interconnected battery grids 81. A strip of pasted alloy coated interconnected battery grids 81a exits the paster 87 and is separated into individual battery plates in a parter 88.

Various modifications may be made to the apparatus of FIGS. 7A-9B. For instance, the strip of interconnected battery grids 74 may optionally be fed through a fluxing station (not shown) before entering the alloy coating bath 76 in order to remove oxides from the surface of the strip of interconnected battery grids 74. A fluxing station may include a pool of flux in a tray underlying the advancing strip of interconnected battery grids 74, a rotating roller that absorbs and picks up flux from the pool and applies it to the underside of the strip of interconnected battery grids 74, and a nozzle overlying the strip of interconnected battery grids 74 for spraying flux onto the topside of the strip of interconnected battery grids 74. Other techniques, e.g. wetted sponges/applicators, for applying the flux to the strip of interconnected battery grids 74 may also be used. In another version of the invention, the alloy coating may be applied to the strip of interconnected battery grids 74 by spraying the alloy onto the strip of interconnected battery grids 74.

Another highly advantageous modification may be made to the apparatus of FIGS. 7A-9B. Specifically, the alloy coating bath 76 is modified such that a stream of inert gas (e.g., nitrogen or argon) may be purged or blown into the molten lead alloy 77 in the alloy coating bath 76. During coating of the strip of interconnected battery grids 74 in the alloy coating bath 76, the inert gas (e.g., nitrogen or argon) is blown into the molten lead alloy 77 such that bubbles form in the molten lead alloy 77. This provides at least three advantages: (1) the alloy coating that forms on the strip of interconnected battery grids 74 is porous and therefore, has a much higher surface area, which further enhances the grid/active material adhesion; (2) the alloy coating that forms on the strip of interconnected battery grids 74 has a lower mass and lower cost as compared to an alloy coating that forms on the strip of interconnected battery grids 74 without the introduction of inert gas into the molten lead alloy 77; (3) the inert gas acts as a shielding film as it is leaving the alloy coating bath 76 which prevents the top of the molten alloy bath from oxidizing thereby reducing dross formation and contamination of the alloy coating bath 76.

The lead alloy used to produce the solid lead alloy strip 65 in the casting drum 63 of the apparatus of any of FIGS. 7A-7D is selected in order to provide a cast alloy strip that may be punched or expanded into a strip of interconnected battery grids having an alloy composition suitable for the intended application of the lead-acid battery. For example, if a lead-acid battery is to be sold as a "maintenance-free" battery, a lead-calcium alloy will be selected for use as the lead alloy applied to the casting drum 63. It is well known in the art that an alloy having lead and calcium may also contain other alloyants such as tin, aluminum and silver. Accordingly, as used herein, the term "lead-calcium alloy" is not intended to be limited strictly to binary lead-calcium alloys, but shall also include alloys having lead and calcium as well as other alloying elements which are not deleterious to the battery or the maintenance-free character thereof. The alloying elements in the lead alloy can be varied to provide optimum performance of the casting drum 63 of the apparatus of any of FIGS. 7A-7D.

Likewise, the lead alloy used to produce the solid lead alloy strip 68 in the twin roll casting rollers 66 of the apparatus of any of FIGS. 8A-8D may be selected in order to provide a cast alloy strip that may be punched or expanded into a strip of interconnected battery grids having an alloy composition suitable for the intended application of the lead-acid battery. If a lead-acid battery is to be sold as a "maintenance-free" battery, a lead-calcium alloy as defined herein will be selected for use as the lead alloy applied to the twin roll casting rollers 66. The alloying elements in the lead alloy can be varied to provide optimum performance of the casting drum 66. Similarly, the lead alloy used to produce the strip of interconnected battery grids 81 using the casting drum 69 of the apparatus of any of FIGS. 9A-9B may be selected in order to provide a strip of interconnected battery grids 81 having an alloy composition suitable for the intended application of the lead-acid battery. If a lead-acid battery is to be sold as a "maintenance-free" battery, a lead-calcium alloy as defined herein will be selected for use as the lead alloy applied to the casting drum 69. The alloying elements in the lead alloy can be varied to provide optimum performance of the casting drum 69. One example lead-calcium alloy that is useful in the present invention includes lead, from about 0.060 wt. % to about 0.070 wt. % calcium, and from about 1.20 wt. % to about 1.50 wt. % tin. Another example lead-calcium alloy that is useful in the present invention includes lead, no less than about 0.8% tin, tin in a ratio to calcium of greater than about 12:1, and silver in the range of about 0 to about 0.02%, the percentages being based upon the total weight of the lead-based alloy. This example lead-calcium alloy is fully described in U.S. Pat. No. 6,117,594.

As detailed above, each apparatus shown in FIGS. 7A-9B produces a strip of interconnected battery grids that is subsequently coated with a lead alloy in the alloy coating bath 76. The lead alloy selected for the coating varies depending on the alloy used to produce the strip of interconnected battery grids. When the strip of interconnected battery grids is formed from a lead-calcium alloy as defined herein, suitable lead alloys for the coating include lead-tin and lead-antimony alloys. The precise composition of the coating is not particularly critical in terms of extending the lives of batteries. On the other hand, there are two general rules applicable to the selection of the lead alloy coating composition. First, the composition of the coating should be selected so as to provide a melt having a melting point which is sufficiently less than the melting point of the lead-calcium alloy strip of interconnected battery grids (e.g., about 620° F. for a typical Pb—0.07 wt. % Ca—1 to 1.5 wt. % tin alloy) so as to preclude complete melting of the strip of interconnected battery grids while it is immersed in the melt. Melting of the surface of the lead-calcium alloy strip of interconnected battery grids is acceptable and, in fact, may be desirable to promote metallurgical bonding of the alloy coating to the strip of interconnected battery grids. Second, the composition of the coating should be such that there is sufficient tin, antimony or other alloying elements present to dope the corrosion layer on the surface of the strip of interconnected battery grids (i.e., at the grid-active material interface) with oxides of the tin, antimony or other alloying elements, and thereby improve the conductivity of the corrosion layer and promote better adhesion of the leady active material to the grid.

Suitable lead-antimony alloys for coating the strip of interconnected battery grids include lead alloys having an antimony content varying from about 1% by weight to about 10% by weight. Other additives such as tin from about 1 wt. % to about 10 wt. % may also be used with the antimonial lead. Hence, the term lead-antimony alloy is not intended to be limited to alloys containing just lead and antimony, but rather is intended to include other low melting alloys thereof which do not negate the intended effects of the antimony or are otherwise deleterious to a battery. For coating a Pb—Ca—Sn alloy (i.e., 0.07 wt. % Ca, and 1 to 1.5 wt. % Sn) strip of interconnected battery grids which melts at about 620° F., the antimony content in the lead alloy coating will preferably be between about 0.5 wt. % and about 3 wt. %, and preferably the tin content in the lead alloy will be between about 2 wt. % and about 5 wt. % so as to have a melting point of about 590° F.

Similarly, suitable lead-tin alloys may be used as all melt at lower temperatures than the typical lead-calcium alloy strip of interconnected battery grids. Lead-tin alloys will preferably comprise about 1 wt. % to about 10 wt. % tin, but otherwise will be determined primarily on the basis of cost owing to the high cost of tin. One example alloy includes lead and about 4 wt. % to about 6 wt. % tin. Other alloyants could be added and therefore, the term lead-tin alloy is not intended to be limited to alloys containing just lead and tin, but rather intended to include other low melting alloys thereof which do not negate the intended effects of the tin or are otherwise deleterious to a battery or the maintenance-free character thereof.

The precise temperature of the melt is not particularly critical so long as it is not so hot as to completely melt the strip of interconnected battery grids in the brief time that the strip of interconnected battery grids are immersed in the melt. Hence, the melt temperature will, in many respects, be determined by the composition (and hence melting point) of the strip of interconnected battery grids being coated. Generally speaking, it is preferred that the temperature of the melt be maintained at a temperature that is at least about 20° F. below the melting point of the strip of interconnected battery grids. On the other hand, it is desirable that the temperature be sufficiently high as to melt some low melting phases on the surface of the strip of interconnected battery grids to promote better bonding of the coating to the strip of interconnected battery grids.

The invention is further illustrated in the following Examples which are presented for purposes of illustration and not of limitation.

Example 1

A continuous strip was prepared from a lead-alloy having the following composition: 0.0425 wt. % calcium, 0.925 wt. % tin, 0.013 wt. % aluminum, 0.0125 wt. % silver and balance lead. A series of interconnected battery grid shapes were then formed in the strip in a progressive punching operation, i.e., features were added to the battery grid through several punching operations. The battery grid wire sections of the strip were then processed in a coining station to coin the grid wires so that the grid wires had a cross-section similar to the grid wire cross-sections 90c in FIG. 4. The interconnected battery grids were then divided into individual grids. The grids were then pasted with a conventional battery paste and formed into battery cells. The battery cells were then cycled in accordance with the SAE J240 life test procedure at a temperature of 75° C. (167° F.) to measure the service life.

Example 2

A continuous strip was prepared from a lead-alloy having the following composition: 0.0425 wt. % calcium, 0.925 wt. % tin, 0.013 wt. % aluminum, 0.0125 wt. % silver and balance lead. A series of interconnected battery grid shapes were then formed in the strip in a progressive punching operation, i.e., features were added to the battery grid through several punching operations. The battery grid wire sections of the strip were then processed in a coining station to coin the grid wires so that the grid wires had a cross-section similar to the grid wire cross-sections 90c in FIG. 4. The interconnected battery grids were then divided into individual grids. The grids were then hand dipped into a pot of molten 94 wt. % lead—6 wt. % tin coating alloy. The grids were dipped slowly into the melt until they bottomed out in the pot and then slowly withdrawn at the same rate for a total immersion time of about 2 seconds. The coating was uniform with no excess buildup on the grid wires or the edges of the grids. The grids were then pasted with a conventional battery paste and formed into battery cells. The battery cells were then cycled in accordance with the SAE 3240 life test procedure at a temperature of 75° C. (167° F.) to measure the service life. The number of cycles for battery cells having lead-tin alloy coated grids prepared in accordance with Example 2 was 20% higher than the number of cycles for the control battery cells having uncoated grids prepared in accordance with Example 1. This demonstrates that batteries including grids made in accordance with the present invention will have better cycle life performance than batteries including conventional grids.

Example 3

A continuous strip was prepared from a lead-alloy having the following composition: 0.0425 wt. % calcium, 0.925 wt. % tin, 0.013 wt. % aluminum, 0.0125 wt. % silver and balance lead. A series of interconnected battery grid shapes were then formed in the strip in a progressive punching operation, i.e., features were added to the battery grid through several punching operations. The battery grid wire sections of the strip were then processed in a coining station to coin the grid wires so that the grid wires had a cross-section similar to the grid wire cross-sections 90c in FIG. 4. The interconnected battery grids were then divided into individual grids. The grids were then hand dipped into a pot of molten 94 wt. % lead—3 wt. % tin—3 wt. % antimony coating alloy. The grids were dipped slowly into the melt until they bottomed out in the pot and then slowly withdrawn at the same rate for a total immersion time of about 2 seconds. The coating was uniform with no excess buildup on the grid wires or the edges of the grids. The grids were then pasted with a conventional battery paste and formed into battery cells. The battery cells were then cycled in accordance with the SAE J240 life test procedure at a temperature of 75° C. (167° F.) to measure the service life. The number of cycles for battery cells having lead-tin-antimony alloy coated grids prepared in accordance with Example 3 was 47% higher at the last reading than the number of cycles for the control battery cells having uncoated grids prepared in accordance with Example 1. In addition, the battery cells of Example 3 continue on test as the lower voltage cutoff for the SAE 3240 has not been reached. This demonstrates that batteries including grids made in accordance with the present invention will have better cycle life performance than batteries including conventional grids.

Thus, the present invention provides a method that can increase the adherence of battery active material to a battery grid produced by a continuous process, such as strip expansion, strip punching, or continuous casting. The method of the present invention increases the cycle life of a battery by enhancing the adhesion between the battery paste material and the battery grid. As a result, a battery manufacturer can take advantage of a low cost continuous grid making process without the drawbacks associated with inadequate paste adhesion.

It is important to note that the method and battery grid as shown in the exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to other exemplary embodiments. Other substitutions, modifications, changes and omissions may be made in the design, operating conditions and arrangement of the exemplary embodiments without departing from the scope of the present invention as expressed in the appended claims.

What is claimed is:

1. A method of making a plurality of battery plates comprising:
    deforming at least a portion of a plurality of grid wire elements of a battery grid comprising a grid network bordered by a frame element, each grid wire element having opposed ends joined to one of a plurality of nodes to define a plurality of open spaces in the grid network, such that the deformed grid wire elements have a first transverse cross-section at a point intermediate their opposed ends that differs from a second transverse cross-section taken at at least one of their opposed ends.

2. The method of claim 1, further comprising applying a lead alloy coating to the battery grid.

3. The method of claim 2 wherein the step of applying a lead alloy coating comprises immersing the battery grid in a melt of the lead alloy coating.

4. The method of claim 3 wherein the step of applying a lead alloy coating to the battery grid further comprises introducing a gas into the melt of the lead alloy coating while immersing the battery grid in the melt.

5. The method of claim 3 wherein the coating comprises a lead-tin alloy.

6. The method of claim 5 wherein the lead-tin alloy comprises between approximately 90 and 99 weight percent lead and between approximately 1 and 10 weight percent tin.

7. The method of claim 5 wherein the lead-tin alloy further comprises antimony.

8. The method of claim 7 wherein the lead-tin alloy comprises between approximately 80 and 98 weight percent lead, between approximately 1 and 10 weight percent tin, and between approximately 1 and 10 weight percent antimony.

9. The method of claim 2 wherein the step of applying a lead alloy coating to the battery grid comprises spraying a melt of the lead alloy coating on the battery grid.

10. The method of claim 2 further comprising quenching the battery grid in a fluid bath after applying the lead alloy coating to the battery grid.

11. The method of claim 2 further comprising age hardening the battery grid at an elevated temperature after quenching the battery grid.

12. The method of claim 1 wherein the step of deforming at least a portion of the grid wire elements comprises stamping at least a portion of the plurality of grid wire elements.

13. The method of claim 12 wherein the grid network and the frame element define opposed substantially planar surfaces, and each first transverse cross-section does not extend beyond the planar surfaces.

14. The method of claim 1 wherein the battery grid is interconnected to at least one other battery grid.

15. The method of claim 14 wherein the battery grid is part of a strip of interconnected battery grids.

16. The method of claim 15 wherein the strip of interconnected battery grids is formed before the step of deforming at least a portion of the grid wire elements.

17. The method of claim 15 wherein the strip of interconnected battery grids is formed by feeding a continuous strip of lead alloy along a linear path aligned with the longitudinal direction of the strip and punching material out of the strip.

18. The method of claim 17 wherein the continuous strip of lead alloy is formed by casting a melt of the lead alloy to form a slab and rolling the slab.

19. The method of claim 1 wherein the first transverse cross-section is non-rectangular and the second transverse cross-section is generally rectangular.

* * * * *